United States Patent
Choi et al.

(10) Patent No.: US 9,822,871 B2
(45) Date of Patent: Nov. 21, 2017

(54) FAULT DETERMINATION SYSTEM OF BUTTON-TYPE SHIFTER

(71) Applicants: Hyundai Motor Company, Seoul (KR); Kostal (Shanghai) Management Co., Ltd., Shanghai (CN)

(72) Inventors: Jee Hyuck Choi, Gyeonggi-do (KR); Mi Yeong Kim, Gyeonggi-do (KR); Bum Jun Kim, Gyeonggi-do (KR); Hyung Suk Kim, Gyeonggi-do (KR); Zhou Hu, Shanghai (CN); Ma Liangyin, Shanghai (CN)

(73) Assignees: Hyundai Motor Company, Seoul (KR); Kostal (Shanghai) Management Co., Ltd., Shanghai (CN)

( * ) Notice: Subject to any disclaimer, the term of this patent is extended or adjusted under 35 U.S.C. 154(b) by 0 days.

(21) Appl. No.: 15/077,304

(22) Filed: Mar. 22, 2016

(65) Prior Publication Data

US 2017/0167602 A1    Jun. 15, 2017

(30) Foreign Application Priority Data

Dec. 9, 2015   (KR) .................. 10-2015-0175460

(51) Int. Cl.
*F16H 61/12*   (2010.01)
*F16H 59/12*   (2006.01)

(52) U.S. Cl.
CPC .............. *F16H 61/12* (2013.01); *F16H 59/12* (2013.01); *F16H 2061/1212* (2013.01)

(58) Field of Classification Search
CPC ...... F16H 61/12; F16H 59/12; F16H 2061/121
See application file for complete search history.

(56) References Cited

U.S. PATENT DOCUMENTS

2015/0144467 A1* 5/2015 Nikami .................. H01H 15/10
                                                                      200/16 R

FOREIGN PATENT DOCUMENTS

| JP | 10-044804 A | 2/1998 |
|---|---|---|
| JP | 2006-256501 A | 9/2006 |
| JP | 2013-159270 A | 8/2013 |
| KR | 10-1998-0060020 A | 10/1998 |
| KR | 10-0285452 B1 | 1/2001 |
| KR | 2015-0059440 A | 6/2015 |

* cited by examiner

*Primary Examiner* — Michael D Lang
(74) *Attorney, Agent, or Firm* — Mintz Levin Cohn Ferris Glovsky and Popeo, P.C.; Peter F. Corless

(57) ABSTRACT

A fault determination system of a button-type shifter is provided. The system maximally guarantees the operation of a shift button while determining a failure of the shift button and improves reliability and fault diagnosis performance for the shift button. The system includes a base that is installed within a vehicle and includes shift buttons and contact points for each of the shift buttons. A controller receives contact signals from the contact points to thus determine a failure of the shift button when any one of the contact points is not sensed or is stuck when the shift button is engaged.

8 Claims, 4 Drawing Sheets

FAULT DETERMINATION SYSTEM OF BUTTON-TYPE SHIFTER

CROSS REFERENCE TO RELATED APPLICATION

The present application claims priority to Korean Patent Application No. 10-2015-0175460, filed Dec. 9, 2015, the entire contents of which is incorporated herein for all purposes by this reference.

BACKGROUND

Field of the Invention

The present invention relates to a fault determination system of a button-type shifter, which improves reliability and fault diagnosis performance when determining whether shift buttons are operable and prevents an error while driving a vehicle by maximally guaranteeing the operation of the shift buttons.

Description of the Related Art

Generally, since power for driving a vehicle changes based on whether the vehicle loads freight, a road condition, or a running speed, a transmission for changing torque is generally mounted between an engine and a driving wheel. The transmission appropriately changes driving power based on a driving condition, and includes a gear for reversing a vehicle.

Recently, automatic transmissions are increasingly being used in which shifting is performed by automatically rather than manually by a driver, and an optimum gear level is selected based on a set driving speed and the engagement degree of acceleration pedal. Such an automatic transmission has a park (P) position, a reverse (R) position, a neutral (N) position, and a drive (D) position, and a gear is selected by manipulating a shift lever.

In addition, multiple devices have been developed to select a shift gear in addition to a lever-type shifter. For example, a button-type shifter has been developed for selecting a shift gear. The button-type shifter uses an electronic transmission system and transmits a shift control signal based on the manipulation (e.g., engagement) of a button. The signal is in the form of an electronic signal that is transmitted to a controller such as a transmission control unit (TCU). In particular, a shifting intention is received at the controller based on user input, and shifting is performed by operating a transmission-side actuator based on a vehicle condition.

However, since a conventional shift button uses only one contact point when sensing the operation thereof, the state of the shift button is determined by the only one contact point. Accordingly, when an error occurs in the contact point, the shift button is determined to not be operable, thus a vehicle cannot be driven.

The foregoing is intended merely to aid in the understanding of the background of the present invention, and is not intended to mean that the present invention falls within the purview of the related art that is already known to those skilled in the art.

SUMMARY

Accordingly, the present invention provides a fault determination system of a button-type shifter, which maximally guarantees the operation of a shift button while determining whether the shift button is faulty (e.g. an error has occurred), and improves reliability and fault diagnosis performance.

In one aspect of the present invention, a fault determination system of a button-type shifter may include: a base, installed within a vehicle, having multiple shift buttons and multiple contact points for each of the multiple shift buttons; and a controller configured to receive contact signals of the contact points, and determine an error of the shift button when any one of the multiple contact points is not sensed or when any one of the multiple contact points is determined to be stuck, when the shift button is pushed or engaged.

The multiple shift buttons may separate into a P range, an R range, an N range, and a D range. The contact points may be arranged in at least three locations within an area of the shift button. The controller may be configured to determine whether the three contact points are faulty (e.g., an error of the contact points), to increase a failure count when any one of the three contact points is not sensed upon engagement of the shift button, and to determine whether the remaining two contact points are faulty when the accumulated failure count reaches a preset value for determining a fault, the preset value having been stored in advance. The controller may further be configured to decrease the accumulated failure count by a predetermined value when the contact point, which was not sensed, is normally sensed.

When the shift button is pushed or engaged and the controller determines that any one of the three contact points is stuck during a preset time for determining a fault, the controller may be configured to determine whether the remaining two contact points are faulty, the preset time having been stored in advance. In response to determining that any one of the remaining two contact points is stuck during a preset time for determining a fault, the controller may be configured to determine whether the remaining one contact point is faulty. In addition, in response to determining that neither of the remaining two contact points is stuck during the preset time for determining a fault, the controller may be configured to change a process to determine whether the three contact points are faulty.

When determining whether the remaining one contact point is faulty, the controller may be configured to detect whether the remaining one contact point is stuck during the preset time for determining a fault, and when the remaining one contact point is stuck during the preset time for determining a fault, the controller may be configured to determine a failure or error of the shift button. The controller may further be configured to detect whether two contact points, excluding the remaining one contact point from the three contact points, are sensed, and when the remaining one contact point is stuck but the two contact points are normally sensed, the controller may be configured to change a process to determine whether the two contact points are faulty. The controller may further be configured to detect whether the three contact points are stuck and whether the three contact points are sensed, and when none of the three contact points is stuck but any one contact point is not sensed, the controller may be configured to change a process to determine whether the remaining two contact points are faulty.

As described above, according to the fault determination system of a button-type shifter, the operation of a shift button may be maximally guaranteed while determining a failure of the shift button, and reliability and fault diagnosis performance for the shift button may be improved.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Figure 1:
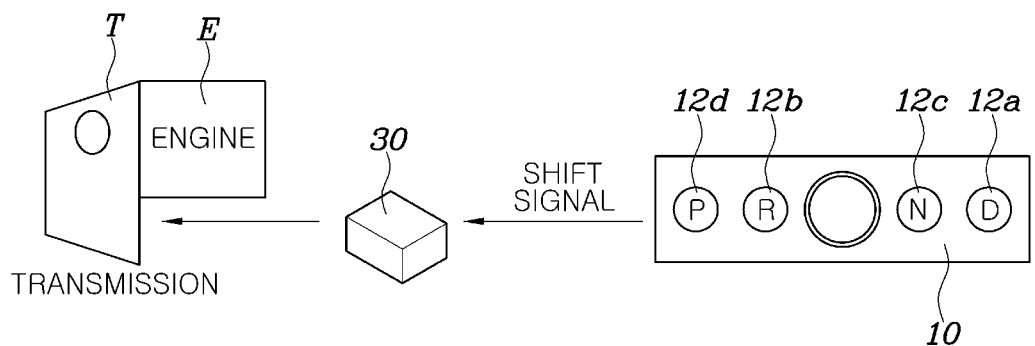
FIG. 1 is a block diagram of a fault determination system of a button-type shifter according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinbelow, a fault determination system of a button type shifter according to an exemplary embodiment of the present invention will be described in detail with reference to the accompanying drawings.

Figure 4:
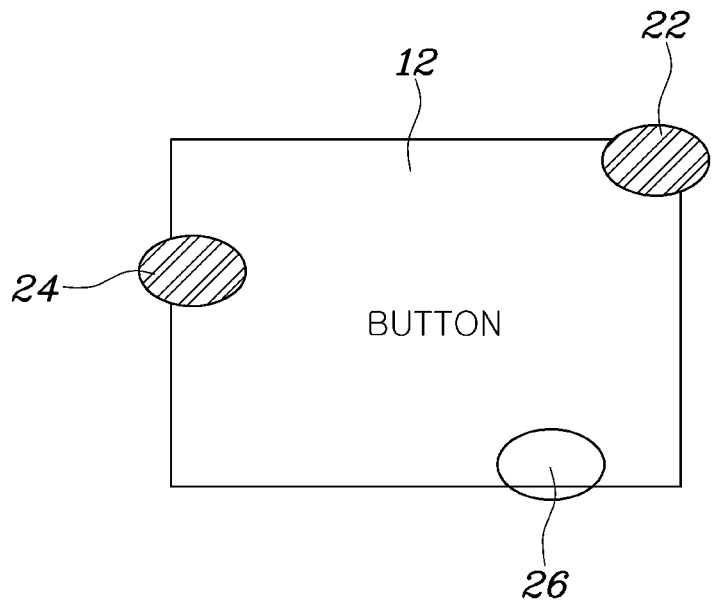
Figure 5:
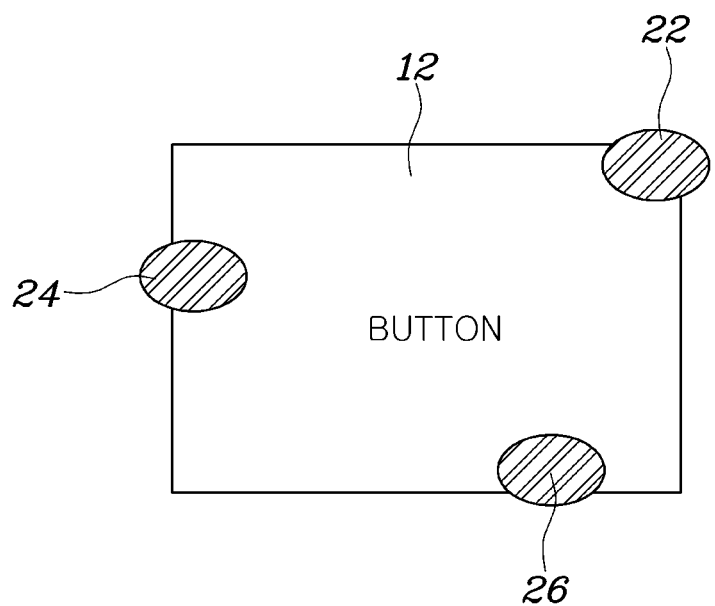
Figure 6:
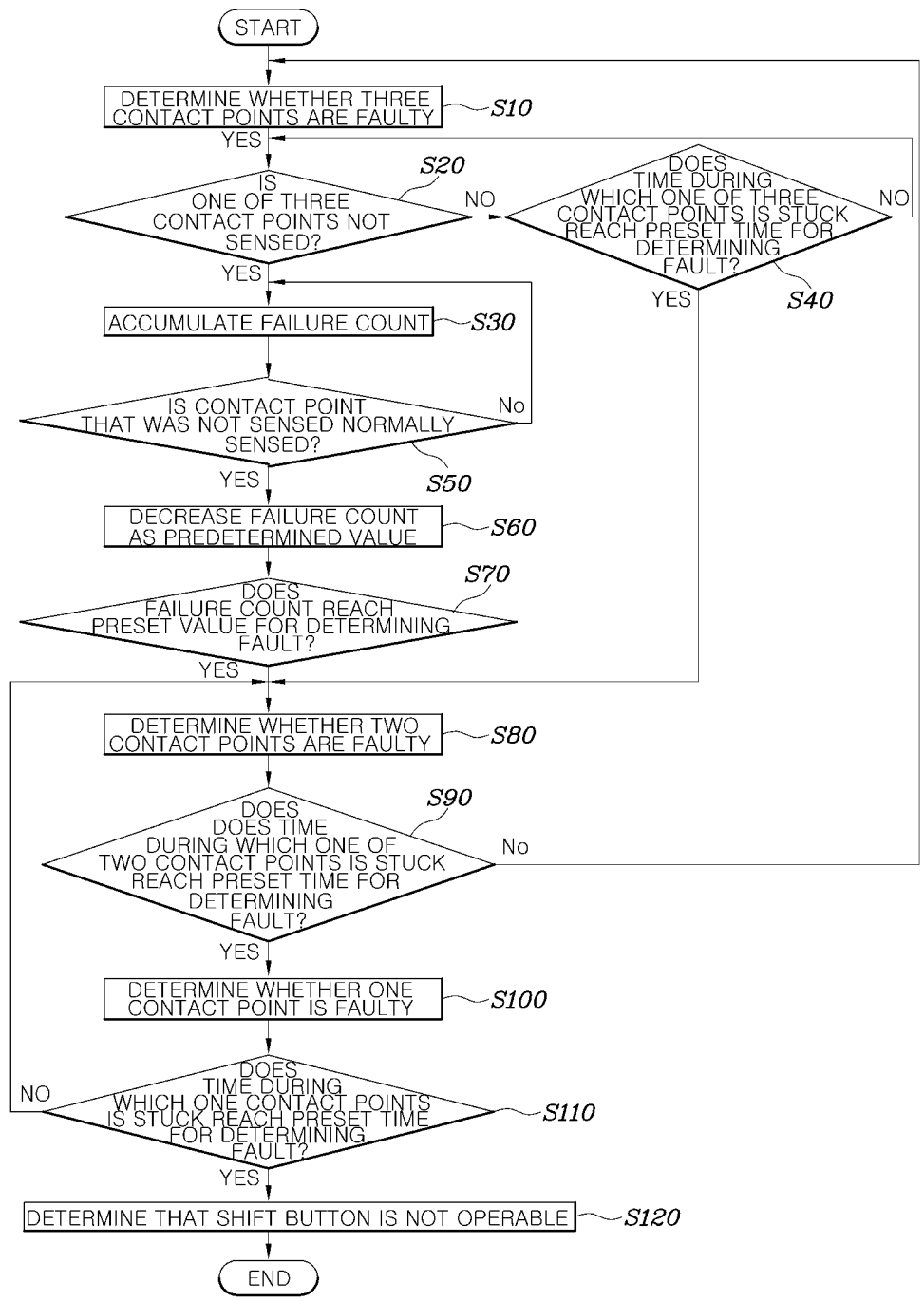
FIG. 6 is a flowchart illustrating a method for controlling the fault determination system of a button-type shifter, illustrated in FIG. 1 according to an exemplary embodiment of the present invention.

FIG. 1 is a block diagram of a fault determination system of a button-type shifter according to an exemplary embodiment of the present invention, FIGS. 2 to 5 are views describing the fault determination system of a button-type shifter illustrated in FIG. 1, and FIG. 6 is a flowchart illustrating a method for controlling the fault determination system of a button-type shifter illustrated in FIG. 1.

As illustrated in FIG. 1, a fault determination system of a button-type shifter according to the present invention is installed within a vehicle and may include: a base 10 having multiple shift buttons 12 and multiple contact points 20 for each of the multiple shift buttons 12; and a controller 30 configured to receive the contact signals of the contact points and determine a failure of the shift button 12 when any one of the multiple contact points 20 is not sensed or is determined to be stuck, when the shift button 12 is pushed or engaged. The determination of a shift button 12 being stuck may indicate that the button is not capable of being pressed, engaged, or pushed but rather is unintentionally fixed in an engaged or disengaged position. The determination of a shift button being stuck may be related to the inability of sensing at a particular contact point in connection with the shift button.

In other words, whether a shift button 12 is faulty or a failure of the shift button 12 may be determined by detecting whether the multiple contact points 20 are sensed or whether the multiple contact points 20 are stuck, whenever the shift button 12 is pushed. Accordingly, whether the corresponding shift button 12 is faulty (e.g., defective, damaged, etc.) may be correctly determined, and a vehicle may be driven more smoothly since the operation of the shift button 12 may be guaranteed during the process of determining a failure of a shift button.

The base 10 of the present invention may be installed at the position at which a conventional shift lever is installed, or alternatively may be installed on a steering wheel. In other words, since the present invention uses shift buttons rather than a lever to execute shifting, the design has a higher degree of freedom. Further, the base 10 may include multiple shift buttons 12, and each of the multiple shift buttons 12 may include multiple contact points 20. Particularly, the multiple shift buttons 12 may include a D range button 12a configured to adjust a transmission T to drive a vehicle in a forward direction, an R range button 12b configured to adjust the transmission T to reverse the vehicle (e.g., operate the vehicle in a reverse direction), an N range button 12c configured to adjust the transmission T to prevent the output power of an engine E of the vehicle from being transmitted to a driving wheel, and a P range button 12d configured to adjust the transmission T to maintain the vehicle in a stopped or parked state.

Figure 2:
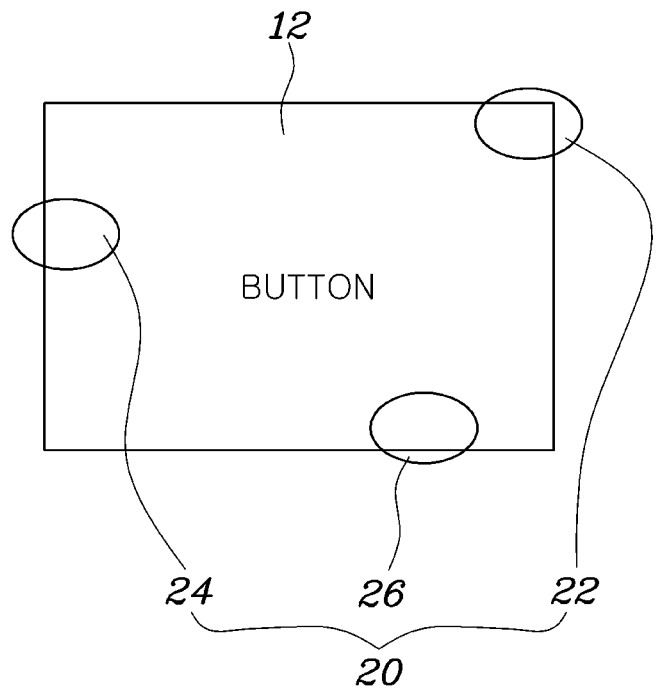
FIGS. 2 to 5 are views describing the fault determination system of a button-type shifter, illustrated in FIG. 1 according to an exemplary embodiment of the present invention.

Particularly, as illustrated in FIG. 2, the contact points 20 may be located in at least three places 22, 24, and 26 within the area of the shift button 12. The shift button 12 may have more than three contact points 20. However, in the present invention, since a failure of the shift button 12 may be determined in phases based on the number of the contact points 20, when the number of the contact points 20 increases, the operation of the shift button 12 may be guaranteed more than needed. In contrast, when one contact point 20 is applied, the situation in which the single contact point 20 is not sensed may immediately be diagnosed as operation error, thus preventing the vehicle from being driven smoothly. Alternatively, when two contact points are used, since it may be difficult to determine which contact point, among the two contact points, is faulty, the accuracy of a recognition signal decreases.

Therefore, the present invention is configured to use three contact points for each shift button 12 and determines a failure of the shift button 12 using the three contact points. Meanwhile, the controller 30 may be configured to determine a failure of the three contact points 20. In particular, the controller 30 may be configured to count (e.g. sum) the number of failures when any one contact point 22, among the three contact points 20, is not sensed when the shift button 12 is pushed or engaged (e.g., rotated or otherwise engaged). When the accumulated failure count reaches a preset value for determining a failure, which has been pre-stored in the controller 30, the controller 30 may be configured to determine a failure of the remaining two contact points 24 and 26.

Figure 3:
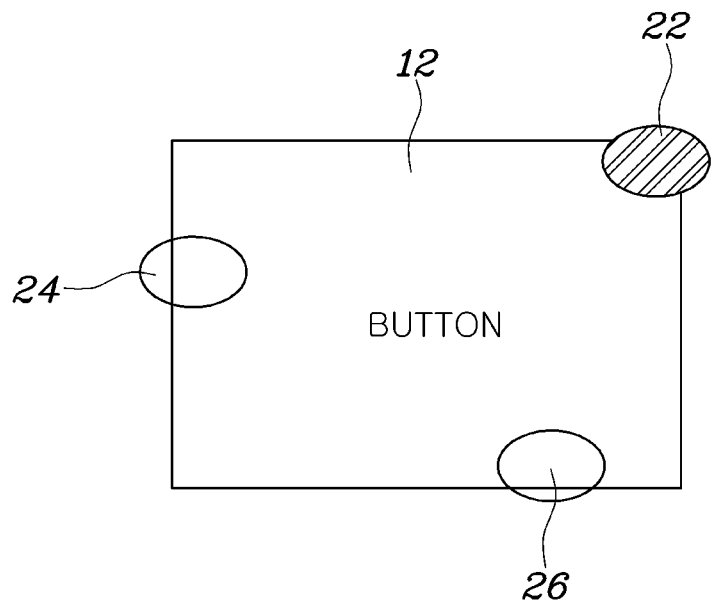

In the present invention, to determine whether the shift button 12 is faulty, first, the controller 30 may be configured to determine whether the three contact points 20 are faulty. In other words, as illustrated in FIG. 3, when any one contact point 22, among the three contact points 20, is not sensed, a failure count increases. When the failure count is repeatedly accumulated and thus reaches the preset value for determining a fault, whether the remaining two contact points 24 and 26 are faulty may be detected as a next step. When the process is converted into determination of whether the remaining contact points 24 and 26 are faulty, the diagnosis may be performed only for the remaining two contact points 24 and 26, excluding the contact point 22, which was not sensed, from the three contact points 20.

In particular, when the contact point 22, which was not sensed, is normally sensed (e.g., typically), the controller 30 may be configured to decrease the accumulated failure count by a predetermined value. Since the accumulated failure count may be decreased by the predetermined value when the contact point 22, the controller may be prevented from responding to a temporary error, thus ensuring a more stable control. For example, when any one contact point 22, among the three contact points 22, 24, and 26, is not sensed, the failure count increases by 1, and when the accumulated failure count reaches 10, which has been stored as the preset value for determining a fault, that the controller may be configured to determine a failure of the shift button 12. The failure count may increase due to temporary error of the shift button 12, but when the contact point 22, which was not sensed, is typically sensed, the failure count decreases by 5.

Meanwhile, when the shift button 12 is pushed and any one contact point 22, among the three contact points 20, is determined to be stuck during a preset time for determining a fault, the controller 30 may be configured to convert the process into determination of whether the remaining two contact points 24 and 26 are faulty, wherein the preset time for determining a fault has been pre-stored in the controller 30. In other words, the controller may be configured to determine a failure of the shift button 12 when the accumulated failure count reaches the preset value for determining a fault and also when a specific contact point 22 is stuck during the preset time for determining a fault. Therefore, the process may be immediately converted to determine whether the remaining two contact points 24 and 26, except for the corresponding contact point 22, are faulty. In particular, the preset time for determining a fault, which has been pre-stored in the controller 30, may be about 30 seconds, but the claimed invention is not limited thereto and other preset times may be used.

As described above, when any one contact point 22, among the three contact points 20, is not sensed or when the contact point 22 is determined to be stuck, whether the remaining two contact points 24 and 26 are faulty may be determined as a next step. Since the shift button 12 may remain operable while the remaining two contact points 24 and 26 are checked, the operation of the shift button 12 may be guaranteed. Additionally, since whether the shift button 12 is faulty is determined in phases, reliability may be improved.

Meanwhile, as illustrated in FIG. 4, in the process of determining whether the remaining two contact points 24 and 26 are faulty, in response to determining that any one of the two contact points 24 and 26 is stuck during a preset time for determining a fault, the controller 30 may be configured to detect whether the remaining one contact point is faulty. Particularly, the preset time for determining a fault, which has been pre-stored in the controller 30, may be set to be the same as the preset time used when determining whether the three contact points 22, 24, and 26 are faulty. When any one of the remaining two contact points 24 and 26 is faulty, it may be difficult to detect which contact point has a failure. Accordingly, a time during which the contact point 20 is stuck may be used to determine whether the contact point 20 is faulty.

As mentioned above, when any one of the two contact points 24 and 26 is determined to be stuck, whether the remaining one contact point 26 is faulty may be determined as a next step. In particular, the shift button 12 may remain operable. Additionally, since this step is also the process for determining a fault in phases, reliability may be improved. In response to determining that neither of the two contact points 24 and 26 is stuck, the controller 30 may be configured to convert the process to determine whether the three contact points 20 are faulty. In other words, in response to determining that neither of the two contact points 24 and 26 is stuck during the preset time for determining a fault, the shift button 12 may operate normally. Accordingly, the process may be converted into the previous step in which whether the three contact points 20 are faulty may be determined.

Meanwhile, as illustrated in FIG. 5, to determine whether the remaining one contact point 26 is faulty, the controller may be configured to detect whether the contact point 26 is stuck during the preset time for determining a fault. When the contact point 26 is stuck during the preset time for determining a fault, the controller may be configured to detect a failure of the shift button 12. In other words, in response to determining that the finally remaining contact point 26 is stuck during the preset time for determining a fault, the controller may be configured to determine a failure of the shift button 12. Therefore, the shift button 12 may be determined to be inoperable due to the failure thereof. In response to determining that the shift button 12 is not operable, the transmission T may be prevented from performing control that corresponds to the shift button 12 even when the corresponding shift button 12 is manipulated.

In particular, the controller 30 may be configured to re-determine whether the two contact points 22 and 24, except for the contact point 26, are sensed. When the two contact points 22 and 24 are normally sensed even when the contact point 26 is stuck, the controller 30 may be configured to convert the process to determine whether the two contact points 22 and 24 are faulty. Alternatively, the controller 30 may be configured to re-determine whether the three contact points 22, 24, and 26 are stuck or whether they are sensed. When none of the three contact points 22, 24, and 26 is stuck but any one contact point 26 is not sensed, the controller 30 may be configured to convert the process to determine whether the two contact points 22 and 24 are faulty.

In other words, in response to determining a failure of the remaining one contact point 26, the controller may be configured to determine that the shift button 12 is not operable. Therefore, to maximally guarantee the operation of the shift button 12, a process for determining whether the shift button is faulty may be repeated. Accordingly, when the finally remaining one contact point 26 is stuck but the two contact points 22 and 24 are normally sensed, whether the two contact points 22 and 24 are faulty may be re-determined. Alternatively, when none of the three contact points 22, 24, and 26 is stuck but only one contact point 26 is not sensed, whether the two contact points 22 and 24 are faulty may be re-determined. Accordingly, the operation of the shift button may be maximally guaranteed, and reliability may be improved.

In the present invention, as illustrated in FIG. 6, to determine whether a shift button 12 is faulty, whether the three contact points are faulty may be determined at step S10. When one contact point, among the three contact points 20, is not sensed at step S20, a failure count may be accumulated at step S30. Even when all of the three contact points are sensed, whether a time during which any one of the three contact points is stuck reaches a preset time for determining a fault (e.g., whether a preset time has elapsed) may be determined at step S40, whereby whether there is a fault may be re-determined.

Meanwhile, while the failure count is accumulated, when the contact point that was not sensed is normally sensed at step S50, the failure count decreases by a predetermined value at step S60, thus preventing incorrect determination caused due to a temporary error. Whether the accumulated failure count reaches a preset value for determining a fault may be determined at step S70, and when the accumulated failure count reaches the preset value for determining a fault, whether the remaining two contact points are faulty may be detected at step S80.

At step S90 whether a time during which any one of the two contact points is stuck reaches a preset time for determining a fault may be determined, and when the time reaches the preset time, whether the finally remaining one contact point is faulty may be detected at step S100. Finally, at step S110 whether a time during which the remaining one contact point is stuck reaches the preset time for determining a fault may be determined, and when the time during which the contact point is stuck reaches the preset time for determining a fault, the shift button may be determined at step S120 to be inoperable. Accordingly, even when the corresponding shift button is manipulated, the transmission may be prevented from performing control that corresponds to the shift button.

As described above, a failure of a shift button may be determined in phases by performing processes from detecting the three contact points 20 to detecting the last one contact point. Therefore, while detecting the multiple contact points in phases, the operation of the shift button may be guaranteed and fault diagnosis may be performed more accurately. Consequently, the fault determination system of a button-type shifter according to the present invention may maximally guarantee the operation of a shift button while determining whether the shift button is faulty, and may improve the fault diagnosis performance and reliability.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A fault determination system of a button-type shifter, comprising:
    a base, installed within a vehicle, including multiple shift buttons and multiple contact points for each of the multiple shift buttons; and
    a controller configured to receive contact signals of the contact points, and determine a failure of the shift button when any one of the multiple contact points is not sensed or when any one of the multiple contact points is determined to be stuck, when the shift button is engaged,
    wherein the contact points are arranged in at least three places within an area of the shift button,
    wherein the controller is configured to:
        determine whether the three contact points are faulty;
        increase a failure count when any one of the three contact points is not sensed when the shift button is engaged; and
        determine whether the remaining two contact points are faulty when the accumulated failure count reaches a preset value for determining a fault, and
    wherein the controller is configured to decrease the accumulated failure count by a predetermined value when the contact point, which was not sensed, is normally sensed.

2. The fault determination system of claim 1, wherein the multiple shift buttons separate into a park (P) range, a reverse (R) range, a neutral (N) range, and a drive (D) range.

3. The fault determination system of claim 1, wherein when the shift button is engaged, in response to determining that any one of the three contact points is stuck during a preset time for determining a fault, the controller is configured to determine whether the remaining two contact points are faulty.

4. The fault determination system of claim 1, wherein in response to determining that any one of the remaining two contact points is stuck during a preset time for determining a fault, the controller is configured to determine whether the remaining one contact point is faulty.

5. The fault determination system of claim 4, wherein in response to determining that neither of the remaining two contact points is stuck during the preset time for determining a fault, the controller is configured to determine whether the three contact points are faulty.

6. The fault determination system of claim 4, wherein when determining whether the remaining one contact point is faulty, the controller is configured to detect whether the remaining one contact point is stuck during the preset time for determining a fault, and when the remaining one contact point is stuck during the preset time for determining a fault, the failure of the shift button is determined.

7. The fault determination system of claim 6, wherein the controller is configured to detect whether two contact points, excluding the remaining one contact point from the three contact points, are sensed, and when the remaining one contact point is stuck but the two contact points are normally sensed, the controller is configured to determine whether the two contact points are faulty.

8. The fault determination system of claim 6, wherein the controller is configured to detect whether the three contact points are stuck and whether the three contact points are sensed, and when none of the three contact points is stuck but any one contact point is not sensed, the controller is configured to determine whether the remaining two contact points are faulty.

\* \* \* \* \*